United States Patent [19]
Frey

[11] 4,212,157
[45] Jul. 15, 1980

[54] SOLID STATE CLOCK
[75] Inventor: LaVerne L. Frey, Delavan, Wis.
[73] Assignee: Borg Instruments Inc., Delavan, Wis.
[21] Appl. No.: 935,215
[22] Filed: Aug. 21, 1978
[51] Int. Cl.$^2$ .............................................. G04C 3/00
[52] U.S. Cl. ........................................ 368/87; 368/218
[58] Field of Search ............ 58/23 A, 23 BA; 330/22, 330/40; 323/22 T; 307/264, 297

[56] References Cited
PUBLICATIONS
Newton on Switching Regulator Drives IC's and Nixies off Batteries, "Electronics" Jul. 6, 1970 p. 77.

*Primary Examiner*—J. V. Truhe
*Assistant Examiner*—L. W. Pojunas, Jr.

*Attorney, Agent, or Firm*—Hosier, Niro & Daleiden, Ltd.

[57] ABSTRACT

A solid state clock for an automobile or the like, which includes display means in the form of a vacuum fluorescent display. Current is supplied from the automobile battery to the display through an integrated circuit or "chip". The voltage from the battery is doubled by an inductor coil coupled between the battery and the integrated circuit. An electrical switching means in the form of a transistor is coupled between the integrated circuit and the inductor coil for supplying converted frequency thereto. A second switching transistor and a Zener diode is provided to regulate the duty cycle of the first transistor to maintain the voltage to the display substantially constant.

34 Claims, 1 Drawing Figure

SOLID STATE CLOCK

BACKGROUND AND SUMMARY OF THE INVENTION

This invention relates to a solid state clock for an automobile or the like, and, more particularly, to circuit means between the automobile battery and the display means of the clock.

More specifically, this invention relates to such a circuit means for increasing the voltage from the automobile battery to the clock display means and for maintaining that voltage substantially constant.

Solid state clocks in automobiles or the like have display means in the form of a vacuum fluorescent display device which derives current from a supply such as a 12-volt battery of the automobile. The display normally is energized by a voltage which exceeds that of the automobile battery, normally in the range of 18–20 volts. Thus, multiplying means is provided between the supply and the display, through an integrated circuit or "chip", to increase, normally doubling, the voltage from the battery. The multiplying means comprises an inductor coil or "doubler" which is connected between the supply and the integrated circuit. The integrated circuit, in turn, directs the increased voltage to the vacuum fluorescent display and components thereof. An oscillating switching means in the form of a transistor is provided between the integrated circuit and the multiplying means. However, the multiplied voltage preferably should be maintained substantially constant so as to avoid any fluctuations in the power to the display and integrated circuit.

Heretofore, it has been proposed to employ a second power transistor on the order of four or five watts as a voltage limiter or regulator between the 12-volt supply and the doubler in order to regulate the voltage to the doubler by limiting the same on the order of 11¼ to 12¼ volts. In other words, this power transistor provides direct means between the supply and the doubler to regulate the voltage thereto.

With the present invention, the direct voltage regulator or power transistor having a larger current carrying capacity between the current supply and the doubler is eliminated, and the oscillating transistor between the integrated circuit and the doubler itself is regulated by a second switching transistor and a Zener diode. The second transistor and Zener diode is effective to shut the first transistor off whenever voltage at the doubler increases to a value set by the Zener diode, such as 18 to 20 volts.

In the exemplary embodiment of the invention, a solid state clock for automobiles or the like includes a display means in the form of a vacuum fluorescent display which includes one or more filaments to illuminate the display. Operating power is supplied to the display from an electrical power supply, such as a 12 volt battery for the automobile, through an integrated circuit or chip. The display requires on the order of 18 to 20 volts and, consequently, voltage multiplying means is coupled between the current supply and the integrated circuit. The multiplying means comprises an inductor coil or "doubler" which increases or doubles the voltage from the supply. Converter frequency is supplied from the integrated circuit to the inductor coil through a first transistor which, in effect, runs or operates the doubler.

Means is provided to regulate the duty cycle of the transistor between the integrated circuit and the doubler. This regulating means comprises a second, switching transistor coupled to the base of the aforesaid first transistor, and the base of the second transistor is coupled through a Zener diode to the doubler. The Zener diode has a predetermined value, such as on the order of 18–20 volts, which is equivalent to the voltage needed for operating the display of the clock. As the voltage at the doubler increases to the value set by the Zener diode, the diode turns the second transistor on which is effective to turn the first transistor off, and thereby, regulates the doubler by means of regulating the transistor between the doubler and the integrated circuit.

Other features and advantages of the invention will be apparent from the following detailed description taken in connection with the accompanying drawing.

DETAILED DESCRIPTION OF THE INVENTION

Figure 1:
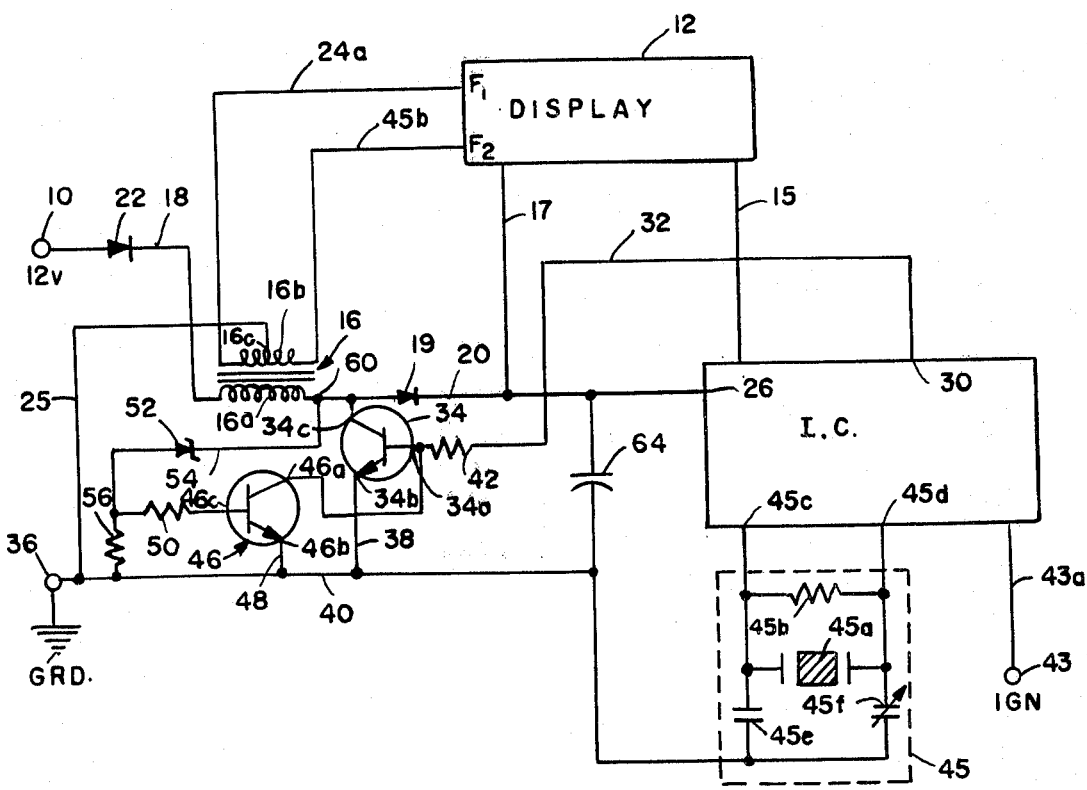
FIG. 1 is a diagram of the circuit means of the present invention, including the clock display and integrated circuit block.

Referring to FIG. 1 in greater detail, the solid state clock of the present invention thereshown is designed for use in an automobile or the like. The clock, like other auxiliary components in the vehicle, derives power for operation from a direct power current supply such as a 12 volt battery 10. The clock includes a display means 12 and, in its illustrated form, an integrated circuit 14, although it will be understood by those skilled in the art that an equivalent discreet component circuit may be used in place of the integrated circuit 14. The display 12 is shown schematically as a block in FIG. 1 and preferably comprises a well known form of a vacuum fluorescent display, for example Futaba Part No. 4-BT-18. The display 14 includes at least two filaments, indicated diagrammatically by the filament inputs $F_1$ and $F_2$ in the drawing. The integrated circuit 14 is likewise shown in the drawing in block diagrammatic form and may comprise a commercially available circuit board or "chip", such as American Microsystems, Inc. Part No. 1485, as is known in the art. Current is supplied from supply 10 to the display 12 through the integrated circuit by means of a line 15 connecting the integrated circuit and display.

The display 12, in actual practice, requires a higher operating voltage than the 12 volt D.C. supply 10 supplies, generally in the range of 18–20 volts. For purposes of providing an increased voltage and for providing, as well, an appropriate operating voltage at the filament inputs $F_1$ and $F_2$ of the display 14, a step down transformer, generally designated 16, is provided having a primary winding 16a and a secondary winding 16b, the primary to secondary windings having a turns ratio of approximately 10 to 1 to thereby provide a 1.75 RMS voltage for the display 12, as presently being described. The opposed ends of the primary winding 16a are coupled between the high voltage terminal 10 of the power supply and an input of the integrated circuit 14 by conductors 18 and 20, respectively. A diode 22 is provided in line 18 between the supply 10 and the primary winding 16a as a safeguard in the event that the polarity at the supply 10 inadvertently is reversed. The opposed end terminals of the transformer secondary winding 16b are coupled by respective conductors 24a and 24b to the filament inputs F₁ and F₂. Line 17 supplies voltage to the grid of the display. The center tap 16c of the secondary winding 16b is coupled to ground 36 of the battery by conductor 25. The primary winding 16a of the transformer 16, in addition to providing an appropriate voltage input for the secondary winding 16b, serves also as a voltage doubler coil to develop a constant, approximately 18 volt signal for the input 26 of the integrated circuit 14 in a manner to be explained.

The aforesaid 18 volt input signal for the integrated circuit 14 is applied to the terminal 26 from the supply 10, through a series electrical path comprising diode 22, line 18, the primary or doubler coil portion 16a of the transformer 16, line 20 and a second diode 19 disposed along line 20 in like polarity to diode 22. The integrated circuit 14 includes a conventional crystal controlled oscillator circuit and a frequency divider therefor as well as conventional clock counter logic for generating a necessary signal input to actuate the display unit 12 to provide a correct visual indicia of time. An output 30 of the integrated circuit 14, leads through line 32 to a switching transistor, generally designated 34.

The clock crystal and certain associated circuitry are disposed externally of the integrated circuit 14, as indicated in the dashed block 45. The circuit within the dashed block 45 comprises a quartz crystal 45a having a natural resonance frequency of 4.194304 megahertz coupled in parallel with a 10 megaohm biasing resistor 45b. The opposed, parallel, connected ends of the crystal 45 and the biasing resistor 45b are coupled to respective input terminals 45c and 45d of the integrated circuit 14 and, as well, to ground through a 20 picofarad capacitor 45e and an adjustable 5–35 picofarad trimming capacitor 45f. The variable trimming capacitor is denoted in standard symbolism by the arrow through the capacitor 45f. A 65.536 kilohertz pick-off on the frequency divider portion of the integrated circuit 14, labelled as terminal 30 in the drawing, is coupled by a conductor 32 to the base 34a of the transistor 34 through a 10,000 ohm current limiting resistor 42. The emitter 34b of the transistor 34 is connected to ground 36 through conductor 38. The collector 34c of the transistor 34 is coupled to the common junction of the doubler or primary transformer coil 16a. In essence, transistor 34 is provided between the integrated circuit 14 and the inductor coil 16 to provide, in conjunction with associated control circuitry, to be described, a substantially constant 18 volt input at the terminal 26 of the integrated circuit 14. The ignition of the automobile 43 of the automobile is effective through the line 43a to shut down the display 12 when the ignition is turned off, but the integrated circuit remains on regardless of whether or not the ignition is on. The integrated circuit continues to function except that it does supply voltage to the display. When the ignition is off there is no output at terminal 30 to the doubler or transformer 16.

As mentioned above, it is desirable to maintain the voltage at terminal 26 on the integrated circuit substantially constant as the voltage from supply 10 is increased beyond its nominal 12 volts. One example of such an increase in voltage might occur when the automobile battery or supply 10 is charged from the alternator. Thus, the multiplying action of the doubler coil 16a must be modified or regulated to sustain a constant output independently of voltage fluctuations above the 12 volt value. It has been proposed that this be done by regulating the voltage directly from the supply 10 to the doubler or inductor coil 16 by means of a power transistor between the supply 10 and the doubler 16. Such a power transistor would have to be capable of handling on the order of four or five watts to provide a necessary power dissipation effective to achieve the desired voltage regulation function.

Power transistors having such capability are relatively expensive. With the present invention, such a regulator (in the form of a power transistor in line 18 between supply 10 and the inductor coil 15) is eliminated by providing means to regulate the voltage by regulating the duty cycle of transistor 34 and thus the effective duty cycle of doubler 16a. More particularly, referring to FIG. 1, a second switching transistor, generally designated 46, is provided for actuating the transistor switch 34 in accordance with a sensed voltage condition. Specifically, the collector 46a of transistor 46 is connected directly to the base 34a of transistor 34. The emitter 46b of transistor 46 is coupled to ground 36 while the base 46c of transistor 46 is coupled through a pair of series resistors 50 and 56 to ground. An anode of a Zener diode 52 or similar break-down device is coupled to the common junction of resistors 50 and 56 while the cathode of the Zener diode 52 is coupled to the common junction of the coil 16a and the emitter 34c of the transistor 34. Resistor 50 limits the base current to protect transistor 36 from an overload. Resistor 56 provides a "bleeder" which maintains transistor 46 turned off when Zener diode 52 is not conducting.

The switching transistor 46, through the circuit described above, regulates the duty cycle of transistor 34 in accordance with the selected break-down voltage of the Zener diode 52 to the end that the capacitor 64 is sustained at a substantially constant charged value corresponding to the selected break-down voltage of the Zener diode 52. Specifically, the approximately 65 kilohertz square wave signal varying between zero volts and the positive voltage input at terminal 26 is applied to the base 34a of the transistor 34 to turn the transistor on during positive voltage half cycles and to turn the transistor off on alternate half cycles of zero voltage. This provides a uniform on-off switching function for the transistor 34 at the 65 kilohertz rate to provide a nominal 50% on duty cycle for the transistor 34. However, switching transistor 46 is effective to prematurely turn transistor 34 off on each "on half cycle" at a point in time when the break-down voltage of Zener diode 52 is exceeded. Specifically, as voltage at the output terminal 60 of inductor coil 16 increases to a value of approximately 18 volts, by known voltage doubler action of the collapsing magnetic field in the coil, Zener diode 52 breaks down to turn on the switching transistor 46. Transistor 34 is abruptly turned off when transistor 45 is turned on. In other words, the break down of Zener diode 52 at its selected break-down voltage of, for example, 18 volts, causes transistor 34 to be turned off prematurely in its duty cycle resulting in a discontinuation of charging current through coil 16a. Without transistor 46 and Zener diode 52, the duty cycle of transistor 34 would have a uniform square wave curve with its on time equaling its off time. This is exemplified by the following formula:

$$V_O = V_I(1 + t_{on}/t_{off})$$

Where:
$V_O$ = Voltage output; $V_I$ = voltage input;
$t_{on}$ = time on; and $t_{off}$ = time off.

It can be seen that the output voltage would be doubled when the on and off times of transistor 34 are equal. However, this ratio is charged by the Zener diode 52 dependent upon the voltage at point 60. In other words, the longer the voltage at point 60 remains equal to or higher than the value of Zener diode 52, the longer switching transistor 46 remains on and switching transistor 34 remains off.

One terminal of a charging capacitor 64 is coupled to the common junction of isolation diode 19 and the input terminal 26 of the integrated circuit 14 with its opposite terminal coupled to ground 36. The capacitor 64 serves to store charging current and maintain the voltage uniform during off periods in the charging cycle.

With the above described circuit, it can be seen that the present invention not only provides means for doubling the voltage from supply 10 to the vacuum fluorescent display 12 through integrated circuit 14, but the voltage is maintained substantially constant without employing a power regulator such as a power transistor directly between the supply 10 and the inductor coil 16. This is done by providing regulating means in the form of transistor 46 and Zener diode 62 which regulate the duty cycle of the transistor 34 which runs the doubler coil 16 from the integrated circuit 14. By eliminating the aforesaid power transistor between supply 10 and doubler coil 16, there is a considerable cost saving because the switching transistor 46 is considerably less expensive than a power regulator between the supply and the doubler coil. It has been found that a transistor on the order of a one-half watt power dissipation capacity may be employed for transistor 46 rather than a four or five watt transistor between the supply 10 and the doubler coil 16. Not only is the power size decreased, along with the relative cost thereof, but such factors as packaging, mounting boards and other components are directly affected which further reduces the overall cost of the solid state clock with which the invention is utilized.

While a particular embodiment of the present invention has been shown and described, it is apparent that various changes and modifications may be made, and it is therefore intended in the following claims to cover all such modifications and changes as may fall within the true spirit and scope of this invention.

I claim:

1. In a solid state clock of the like required to provide an accurate and reliable time indication when operated from a power supply having undesired voltage fluctuations, the combination comprising:
    display means for providing a visual display of time or other information in accordance with predetermined signal inputs;
    circuit means coupled between said power supply and said display means for supplying said predetermined signal input to said display and for developing a first switching signal having a predetermined frequency;
    voltage multiplying means coupled between said power supply and said circuit means for multiplying the variable voltage output of said power supply and for supplying said multiplied voltage to an input of said circuit means;
    first electrical switching means responsive to said first switching signal and coupled to said circuit means and said multiplying means for establishing a nominal, effective, duty cycle for said voltage multiplying means; and
    second electrical switching means comprising a break-down device having a first, high impedance state for all signal outputs from said multiplying means below a predetermined level and a second, low impedance state for all signal outputs from said multiplying means above said predetermined level, said second electrical switching means being coupled to said first switching means for regulating the effective duty cycle of said first switching means and the effective duty cycle of said multiplying means in accordance with whether said breakdown device is in said first or said second state.

2. The combination of claim 1 wherein said first electrical switching means comprises a transistor.

3. The combination of claim 2 wherein the base of said transistor is coupled to said circuit means and the collector of said transistor is coupled to said multiplying means.

4. The combination of claim 3 including resistance means coupled between the base of said transistor and said integrated circuit.

5. The combination of claim 2 wherein said second electrical switching means includes a second transistor.

6. The combination of claim 5 wherein the collector of said second transistor is coupled to said first transistor, and the base of said second transistor is coupled to said multiplying means.

7. The combination of claim 6 including a Zener diode coupled between the base of said second transistor and said multiplying means.

8. The combination of claim 7 including resistance means coupled between the base of said second transistor and said Zener diode.

9. The combination of claim 7 including resistance means coupled between the base of said second transistor and ground.

10. The combination of claim 6 wherein the emitter of said second transistor is coupled to ground.

11. The combination of claim 2 wherein the emitter of said transistor is coupled to ground.

12. The combination of claim 1 including a diode coupled between said power supply and said multiplying means.

13. The combination of claim 1 including capacitor means connected in the circuit between said integrated circuit means and said multiplying means and coupled to ground.

14. The combination of claim 1 wherein said first electrical switching means comprises a transistor and said second electrical switching means includes a transistor; the base of said first transistor is coupled to said integrated circuit means, the collector of said first transistor is coupled to said multiplying means, and the emitter of said first transistor is connected to ground; the base of said second transistor is coupled to said multiplying means, the collector of said second transistor is coupled to the base of said first transistor, and the emitter of said second transistor is coupled to ground; and including a Zener diode connected in line between the base of said second transistor and said multiplying means.

15. The combination of claim 14 including resistance means coupled between the base of said second transistor and said Zener diode.

16. The combination of claim 14 including resistance means coupled between the base of said second transistor and ground.

17. The combination of claim 14 including resistance means coupled between the base of said first transistor and said circuit means.

18. The combination of claim 14 including a diode coupled between said power supply and said multiplying means.

19. The combination of claim 14 including capacitor means connected in the circuit between said circuit means and said multiplying means and coupled to ground.

20. The circuit means of claim 14 wherein said multiplying means comprises an inductor coil.

21. The combination of claim 1 wherein said circuit means includes a diode and said multiplied voltage of said voltage multiplying means is applied through said diode to said display means.

22. The combination of claim 21 wherein said second electrical switching means comprises a device for sensing the magnitude of said multiplied voltage at the side of said diode remote from said display means and wherein said duty cycles are regulated in accordance with variations in the magnitude of said sense voltage.

23. The combination of claim 22, including a clock frequency generating means and wherein said first switching signal is derived from and of a frequency corresponding to said clock frequency generating means.

24. In a solid state clock or the like including clock frequency generating means required to provide an accurate and reliable time indication when operated from a power supply having undesired voltage fluctuations, the combination comprising:
   display means for providing a visual display of time or other information in accordance with predetermined signal inputs;
   circuit means coupled between said power supply and said display means for supplying said predetermined signal input to said display;
   voltage multiplying means coupled between said power supply and said circuit means for multiplying the variable voltage output of said power supply and for applying said multiplied voltage to an input of said circuit means;
   first electrical switching means responsive to said clock frequency generating means for developing a first switching signal corresponding to said clock frequency and coupled to said circuit means and said multiplying means to establish a nominal, effective, duty cycle for said voltage multiplying means corresponding to alternate half-cycles of said first switching signal; and
   second electrical switching means comprising an electronic break-down switching device coupled to said first switching means and responsive to the voltage developed by said voltage multiplying means to reduce the duty cycle of said first switching means and the effective duty cycle of said multiplying means when the voltage developed by said multiplying means exceeds a predetermined value.

25. In a solid state clock or the like required to provide an accurate and reliable time indication when operated from a power supply having undesired voltage fluctuations, the combination comprising:
   display means for providing a visual display of time or other information in accordance with predetermined signal inputs;
   circuit means coupled between said power supply and said display means for supplying said predetermined signal input to said display and for developing a first switching signal having a predetermined frequency;
   voltage multiplying means coupled between said power supply and said circuit means for multiplying the variable voltage output of said power supply and for applying said multiplied voltage to an input of said circuit means;
   first electrical switching means comprising a transistor responsive to said first switching signal and coupled to said circuit means and said multiplying means for establishing a nominal, effective, duty cycle for said voltage multiplying means; and
   second electrical switching means comprising a second transistor coupled to said first switching means for regulating the effective duty cycle of said first switching means and the effective duty cycle of said multiplying means, the collector of said second transistor being coupled to said first transistor, the base of said second transistor being coupled to said multiplying means, and including a Zener diode coupled between the base of said second transistor and said multiplying means.

26. The combination of claim 25 including resistance means coupled between the base of said second transistor and said Zener diode.

27. The combination of claim 25 including resistance means coupled between the base of said second transistor and ground.

28. In a solid state clock or the like required to provide an accurate and reliable time indication when operated from a power supply having undesired voltage fluctuations, the combination comprising:
   display means for providing a visual display of time or other information in accordance with predetermined signal inputs;
   circuit means coupled between said power supply and said display means for supplying said predetermined signal input to said display and for developing a first switching signal having a predetermined frequency;
   voltage multiplying means coupled between said power supply and said circuit means for multiplying the variable voltage output of said power supply and for applying said multiplied voltage to an input of said circuit means;
   first electrical switching means comprising a first transistor responsive to said first switching signal and coupled to said circuit means and said multiplying means for establishing a nominal, effective, duty cycle for said voltage multiplying means, the base of said first transistor being coupled to said circuit means, the collector of said first transistor being coupled to said multiplying means, and the emitter of said first transistor being connected to ground; and
   second electrical switching means including a transistor coupled to said first switching means for regulating the effective duty cycle of said first switching means and the effective duty cycle of said multiplying means, the base of said second transistor being coupled to said multiplying means, the collector of said second transistor being coupled to the base of said first transistor, and the emitter of said second transistor being coupled to ground, and including a Zener diode connected in line between the base of said second transistor and said multiplying means.

29. The combination of claim 28 including resistance means coupled between the base of said second transistor and said Zener diode.

30. The combination of claim 28 including resistance means coupled between the base of said second transistor and ground.

31. The combination of claim 28 including resistance means coupled between the base of said first transistor and said integrated circuit.

32. The combination of claim 28 including a diode coupled between said power supply and said multiplying means.

33. The combination of claim 28 including capacitor means connected in the circuit between said circuit means and said multiplying means and coupled to ground.

34. The combination of claim 28 wherein said multiplying means comprises an inductor coil.

* * * * *